(12) United States Patent
Tschirhart et al.

(10) Patent No.: US 9,891,700 B2
(45) Date of Patent: Feb. 13, 2018

(54) POWER MANAGEMENT FOR DATACENTER POWER ARCHITECTURES

(71) Applicant: Infineon Technologies Austria AG, Villach (AT)

(72) Inventors: Darryl Tschirhart, Torrance, CA (US); Benjamim Tang, Rancho Palos Verdes, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 14/873,898

(22) Filed: Oct. 2, 2015

(65) Prior Publication Data
US 2017/0097674 A1    Apr. 6, 2017

(51) Int. Cl.
| | |
|---|---|
| G06F 1/00 | (2006.01) |
| G06F 1/32 | (2006.01) |
| G06F 1/20 | (2006.01) |
| G06F 1/26 | (2006.01) |

(52) U.S. Cl.
CPC ............ G06F 1/3296 (2013.01); G06F 1/206 (2013.01); G06F 1/26 (2013.01); G06F 1/3206 (2013.01); G06F 1/3228 (2013.01)

(58) Field of Classification Search
CPC ....... G06F 1/3296; G06F 1/206; G06F 1/3206
USPC ........... 713/320, 322, 300; 714/40; 323/234; 711/105; 1/1
See application file for complete search history.

(56) References Cited

U.S. PATENT DOCUMENTS

| | | | | |
|---|---|---|---|---|
| 8,635,470 | B1* | 1/2014 | Kraipak | G06F 1/206 713/300 |
| 8,990,591 | B2* | 3/2015 | Zou | G06F 1/3203 713/300 |
| 2007/0192638 | A1* | 8/2007 | Grasso | G06F 1/26 713/300 |
| 2008/0222435 | A1* | 9/2008 | Bolan | G06F 1/3203 713/310 |
| 2009/0055665 | A1* | 2/2009 | Maglione | G06F 1/206 713/320 |

(Continued)

FOREIGN PATENT DOCUMENTS

WO    2015023191 A1    2/2015

*Primary Examiner* — Aurel Prifti
(74) *Attorney, Agent, or Firm* — Murphy, Bilak & Homiller, PLLC

(57) ABSTRACT

A method of managing system resources managing resource utilization for a system board that includes a plurality of processors, memory associated with each of the processors, a plurality of voltage regulators configured to regulate voltages applied to the processors and memories, and a board manager configured to manage resources of the system board includes communicating operating condition information from the board manager to controllers of the voltage regulators independent of the processors also communicating with the controllers, the operating condition information received by each controller indicating a computing load for the processor regulated by the voltage regulator controlled by that controller. The method further includes controlling the voltage regulators based on the operating condition information, so as to set the power limit of the voltage regulators in accordance with the processing load indicated by the operating condition information communicated by the board manager to the controllers for each processor.

25 Claims, 4 Drawing Sheets

(56) References Cited

U.S. PATENT DOCUMENTS

| | | | |
|---|---|---|---|
| 2009/0125737 A1* | 5/2009 | Brey | G06F 1/3203 |
| | | | 713/322 |
| 2009/0144587 A1* | 6/2009 | Barrenscheen | G05B 19/0421 |
| | | | 714/40 |
| 2010/0149002 A1* | 6/2010 | Chiu | H03M 7/04 |
| | | | 341/55 |
| 2010/0153755 A1* | 6/2010 | Chiu | G06F 1/28 |
| | | | 713/300 |
| 2011/0115447 A1* | 5/2011 | Lin | H02M 3/1584 |
| | | | 323/234 |
| 2012/0079290 A1* | 3/2012 | Kumar | G06F 1/26 |
| | | | 713/300 |
| 2013/0246820 A1* | 9/2013 | Branover | G06F 1/3296 |
| | | | 713/320 |
| 2014/0189225 A1* | 7/2014 | Conrad | G06F 1/3243 |
| | | | 711/105 |
| 2014/0201550 A1* | 7/2014 | Rusu | G06F 1/324 |
| | | | 713/322 |
| 2016/0018869 A1* | 1/2016 | Raghavan | G06F 1/3228 |
| | | | 713/320 |
| 2017/0031782 A1* | 2/2017 | Totten | G06F 1/26 |

* cited by examiner

POWER MANAGEMENT FOR DATACENTER POWER ARCHITECTURES

TECHNICAL FIELD

The present application relates to power management schemes for datacenter power architectures, and particularly relates to dynamic scaling of power components within a datacenter for optimum power efficiency.

BACKGROUND

Datacenter power architectures include multiple converter stages to convert the AC main power supply to the low DC voltage CPU (central processing unit), memory, and other electronic components included in the system such as memory, graphics logic, I/O (input/output), etc. There are multiple racks within a datacenter, and each rack contains multiple server boards. In one example, a 48V distribution voltage is converted down to 12V on each board, which is then converted by voltage regulators (VR), and point of load (POL) converters to the low voltage required by the digital circuitry. Each board typically contains N CPUs (where N can be 2 or 4, for example); and 2 or more memory banks per CPU. Optimum efficiency of each power conversion stage is highly desirable as the total input power required is a function of the product of the efficiencies of all stages. Moreover, much of the energy consumed by datacenters is used for thermal management for fans and air conditioning. Inefficient use of computing resources has the potential to lead to inefficient operation of the power converters which in turn strains the cooling systems. Thus, small improvements to the power management scheme at the individual CPU level can lead to dramatic power efficiencies at the datacenter level.

SUMMARY

A method of managing resource utilization for a system board is disclosed. The system board includes a plurality of processors, memory associated with each of the processors, a plurality of voltage regulators configured to regulate voltages applied to the processors and memories, and a board manager configured to manage resources of the system board. According to an embodiment, the method includes communicating operating condition information from the board manager to controllers of the voltage regulators independent of the processors also communicating with the controllers, the operating condition information received by each controller indicating a computing load for the processor regulated by the voltage regulator controlled by that controller. The method further includes controlling the voltage regulators based on the operating condition information, so as to set the power limit of the voltage regulators in accordance with the processing load indicated by the operating condition information communicated by the board manager to the controllers for each processor. The individual processors are permitted to control their respective voltages, but the board manager can set the power limit at the voltage regulators. Each power limit determined by the board manager accounts for the dynamic voltage set by the corresponding processor.

A system board is disclosed. According to an embodiment, the system board includes a plurality of processors, memory associated with each of the processors, a plurality of voltage regulators configured to regulate voltages applied to the processors and memories, and a board manager. The board manager is configured to communicate operating condition information to controllers of the voltage regulators independent of the processors also communicating with the controllers, the operating condition information received by each controller indicating a computing load for the processor regulated by the voltage regulator controlled by that controller. The board manager is further configured to control the voltage regulators via the respective controllers based on the operating condition information, so as to set the power limit of the voltage regulators in accordance with the processing load indicated by the operating condition information communicated by the board manager to the controllers for each processor.

A datacenter is disclosed. According to an embodiment, the datacenter includes a plurality of racks, each rack having a rack manager configured to manage resources of that rack, a plurality of system boards, each system board having a plurality of processors, memory associated with each of the processors, a plurality of voltage regulators configured to regulate voltages applied to the processors and memories, and a board manager. The board manager is configured to manage resources of that system board by communicating operating condition information to controllers of the voltage regulators of the system board independent of the processors also communicating with the controllers, the operating condition information received by each controller indicating a computing load for the processor regulated by the voltage regulator controlled by that controller, and by controlling the voltage regulators of the system board via the respective controllers based on the operating condition information, so as to set the power limit of the voltage regulators in accordance with the processing load indicated by the operating condition information communicated by the board manager to the controllers for each processor. The datacenter manager further includes a datacenter manager configured to manage resources of the datacenter.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein utilize power managers to generate a power efficiency profile of the components within a datacenter, and to control utilization of these components based upon the determined power efficiency profile. At the board level of the datacenter, a board manager has a direct communication link to the controllers of the voltage regulators. The controllers manage operation of the voltage regulators so that the voltage applied to the processors is regulated efficiently, and have the ability to enter a variety of different power modes. The board manager thus has a direct communication link to the voltage regulator controllers that is independent of the processors communicating with the controllers. The board manager receives telemetry information (e.g., input power of the voltage regulators) that indicates the power efficiency of the voltage regulators associated with each processor. Using this telemetry information, the board manager can generate an efficiency profile that indicates which processors on the board should be used under what conditions for optimum power efficiency.

There are several notable advantages to the embodiments described herein in comparison to conventional datacenter power management techniques. Conventionally, each processor communicates directly with the controller of its voltage regulator and throttles power states up or down, depending upon a variety of factors. However, the processors do not have visibility to the power efficiency or the utilization of other processor-voltage regulator pairings in the system. For a variety of reasons, certain ones of the voltage regulators on each board may be more or less efficient under given power settings. These reasons may include process variation of the components and physical separation distances of the components, for example. The board manager assigns workload to those processor-voltage regulator pairings that are most efficient under given conditions, and only utilizes the less efficient processor-voltage regulator pairings when needed. Furthermore, the board manager can override the power state of the voltage regulators. The processors remain free to adjust their respective voltages, and the corresponding voltage regulator will respond. This avoids unnecessary transitions between power modes. This concept can be implemented at each level of hierarchy within the system. For example, at the rack level, which includes multiple boards per rack, each rack can include a power manager that allocates workload to individual boards within the respective racks using a similar priority scheme. The power manager of each rack can also control cooling settings, such as fan speed and temperature within the rack. The same concept can be applied at the datacenter level using a power manager that controls multiple racks.

Figure 1:
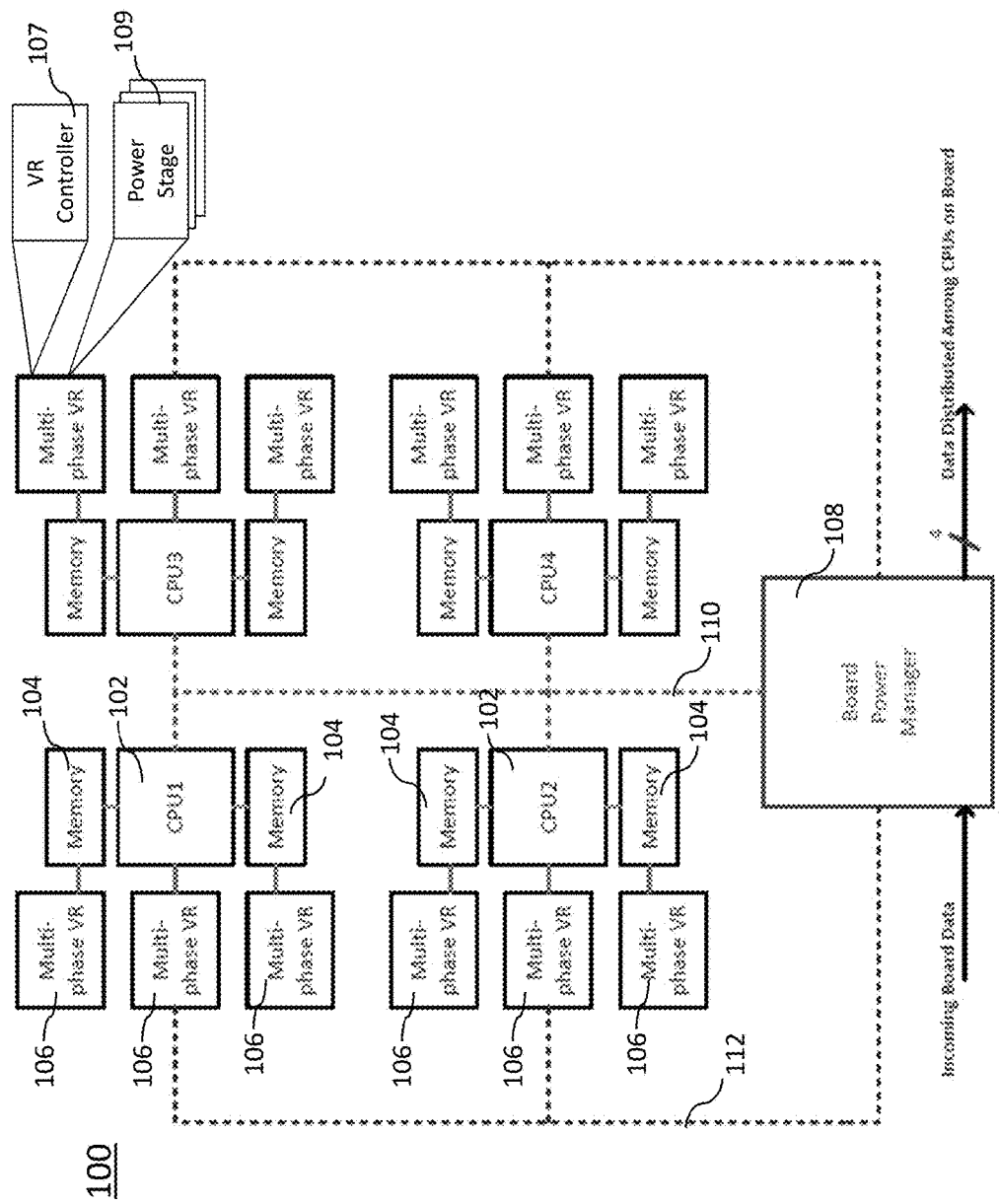
FIG. 1 illustrates a block diagram of a system board that includes a board power manager configured to manage resources of the system board, according to an embodiment.

Referring to FIG. 1, a representative block diagram of a system board 100 that is configured to manage resource utilization is depicted, according to an embodiment. The system board 100 includes a plurality (e.g., two, three, four, etc.) of processors 102 (e.g., CPUs). The system board 100 further includes at least one memory 104 associated with each one of the processors 102. For example, as shown in FIG. 1, two memory 104 units are coupled to each one of the processors 102. The system board 100 further includes a plurality of voltage regulators (VR) 106 configured to regulate voltages applied to the processors 102 and memories 104. According to an embodiment, the voltage regulators 106 are multiphase voltage regulators 106 that include two or more power stages 109, each power stage 109 providing a phase of the multiphase voltage regulator and configured to deliver current to the CPU. In the case of a multiphase buck converter, each power stage 109 of the multiphase buck converter includes a high-side transistor and a low-side transistor for coupling that phase to the corresponding processor 102 through an inductor.

As the power demand for the CPU changes, the voltage regulators 106 can dynamically activate or deactivate the phases. Furthermore, at periods of low usage, the the voltage regulator 106 can select a subset of the power phases and deactivate the other power phase(s). This is commonly referred to as phase shedding. Each voltage regulator 106 also includes a controller 107 for managing operation of the respective voltage regulators. The voltage regulators are logically illustrated as single units, but can be implemented as a collection of separate components such as power transistor dies, controller dies, capacitors, inductors, etc.

The system further includes a board manager 108 that communicates with each of the processors 102, each of the memory 104 units, and each of the voltage regulators 106. To this end, the system includes a first communication link 110 between the board manager 108 and the voltage regulators 106, and a second communication link 112 between the board manager 108 and the voltage regulators 106. The first and second communication links 110, 112 may be provided by a serial bus, for example. According to an embodiment, the first and second communication links 110, 112 are independent from one another. The board manager 108 can have direct, two-way communication with the voltage regulators 106 (and more particularly the controllers 107 associated with each voltage regulator 106) without using the communication link between the processors 102 and the voltage regulators 106.

The board manager 108 is configured to manage the resource utilization of the system board 100 in the following way. The board manager 108 communicates operating condition information from the board manager 108 to the controllers 107 of the voltage regulators 106. The operating condition information indicates processor computing load to the VR controllers 107. When the board manager 108 communicates the operating condition information to the VR controllers 107, the board manager 108 is communicating current or power. The voltage regulators 106 do not have knowledge or the ability to translate actual processor computing load to operating state. Instead, the board manager 108 performs this function. In one embodiment, the board manager 108 pre-emptively communicates electrical load limit to the VR controllers 107. For example, the board manager translates processor computing load e.g. in MIPS (millions of instructions per second) to current or power. In a second embodiment, the board manager 108 does not translate processor computing load but instead notifies the VR controllers 107 that the electrical load will not get any worse.

The operating condition information is communicated from the board manager 108 to the controllers 107 of the voltage regulators 106 independent of the processors 106 also communicating with the VR controllers 107. This independent communication can be effectuated by the second communication link 112, as previously discussed.

The board manager 108 is configured to control the voltage regulators 106 based on the operating condition information. The control of the voltage regulators 106 by the board manager 108 is in accordance with the computing load indicated by the operating condition information communicated by the board manager 108 to the VR controllers 107 associated with each processor 102. That, is the board manager 108 can set the power limit of the voltage regulators 106 based on the operating condition information. The processors 106 are permitted allowed to control their respective voltages, while the board manager 108 sets the respective power limits. Each power limit set by the board manager 108 accounts for the dynamic voltage set by the corresponding processor 102.

One way that the board manager 108 can optimize the power efficiency of the system board 100 involves utilizing telemetry information to allocate processing workload to the most efficient pairings of processors 102 and voltage regulators 106. According to an embodiment, the board manager 108 receives telemetry information from the voltage regulators 106 at the board manager 108. The telemetry information may be any information that provides some indication as to the efficiency of the voltage regulators 106. For example, the telemetry information may include activity levels of each processor 102, input voltage, current and/or power of each voltage regulator 106, output voltage, current and/or power of each voltage regulator 106, voltage of each processor 102, current of each processor 102, temperature of each processor 102, temperature of each regulator 106, etc. The telemetry information can be communicated to the second communication link 112, for example.

The board manager 108 is configured to prioritize utilization of the processors 102, based on the efficiencies of the voltage regulators 106 for the different power modes. That is, the board manager 108 can utilize the telemetry information to determine which ones of the pairings of processors 102 and voltage regulators 106 should be given higher priority and which ones of the pairings of processors 102 and voltage regulators 106 should be given lower priority. Although each processor 102/voltage regulator 106 pairing may nominally operate at the same efficiency under the same conditions, there are a variety of reasons why the processor 102/voltage regulator 106 pairings do not behave nominally. For example, one or more components of each voltage regulator 106 such as output inductors, output capacitors, input capacitors, etc. may vary, due to process variation. Furthermore, the physical layout of the processors 102, memories 104, and voltage regulators 106 may result in certain communication paths being faster than others. According to an embodiment, the board manager 108 generates a profile of the input power of each voltage regulator 106 as a function of computing level of the respective processors 102 for the different power modes. That is, the board manager 108 gathers data about which pairings of processors 102 and voltage regulators 106 perform better than others, in a given power setting, and maps this data into a priority scheme.

The board manager 108 directs incoming board data to the processors 102 based on the prioritized utilization, so that the incoming board data is first directed to the processors 102 whose voltage regulators 106 are more efficient and then directed to the processors 102 whose voltage regulators 106 are less efficient. This prioritized utilization occurs only if additional processing resources are needed to process the incoming board data. That is, the board manager 108 is only responsive to load conditions that impose a change to the voltage regulation of at least one processor 102 and thus would benefit from a priority scheme indicating which pairings of processors 102 and voltage regulators 106 should be used first.

According to an embodiment, the incoming board data is directed to the processors 102 by the board manager 108 based on the generated profiles so that the incoming board data is first directed to the processors 102 whose voltage regulators 106 have a lower input power to computing level profile and then directed to the processors 102 whose voltage regulators 106 have a higher input power to computing level profile only if additional processing resources are needed to process the incoming board data. A working example of this resource dedication will now be discussed for illustration purposes. The profile generated by the board manager 108 may indicate that the two processors 102 on the system board 100 operating at 80% of peak power consumption are more efficient than four of the processors 102 operating at 40% of peak power consumption. Based on this knowledge, the board manager 108 will direct the incoming board data to the two more efficient processors 102 so that these processors 102 will perform the computation and so that the two less efficient processors 102 can be deactivated or utilized only if extra processing resources are needed to handle the incoming data.

In addition to the resource allocation priority management scheme described above, the board manager 108 can be used to control the voltage regulators 106 independently from the respective processors 102. In the absence of the board manager 108 and the second communication link 112 between the board manager 108 and the voltage regulators 106, the voltage regulators 106 can only be externally controlled by the processors 106. In that case, the power mode of the voltage regulators 106 is controlled directly by the processor 102, without regard for the efficiency of the processor 102 and voltage regulator 106 and without regard for the likely allocation of future processing requests amongst the system board 100. The system overcomes this drawback using the second communication link 112 between the board manager 108 and the voltage regulators 106 to expedite the process of instructing the voltage regulators 106 to change power states, and/or to eliminate unnecessary transitions of the voltage regulators 106 between power states.

According to an embodiment, the operating condition information (e.g., an indication of a computing load for the processor 102) is preemptively communicated from the board manager 108 to a first one of the VR controllers 107 before the processor 102 associated with the first VR controller 107 enters a limited power range. The preemptively communicated operating condition information indicates that the processor 102 associated with the first VR controller 107 is expected to eventually enter the limited power range and remain in the limited power range for a predetermined time period. Based on this information, a reduced power operating state for the voltage regulator 106 controlled by the first VR controller 107 based on the preemptively communicated operating condition information is determined. According to another embodiment, the board manager 108 communicates the operating condition information from the board manager 108 to a first one of the VR controllers 107 after the processor 102 associated with the first VR controller 107 enters a limited power range. In this case, the operating condition information indicates that the processor 102 associated with the first VR controller 107 has entered the limited power range and will remain in the limited power range for a predetermined time period. In either case, the voltage regulator 106 controlled by the first VR controller 107 is operated in the reduced power state, based upon the direct communication of the operating condition information between the board manager 108 and the first VR controller 107. The first VR controller 107 can be instructed to remain in the reduced power operating state until the board manager 108 indicates otherwise. In this way, the board manager 108 can override any instructions that the processors 102 might give to the controllers 107 of the voltage regulators 106 associated with these processors 102.

The system can also use the operating condition information to expedite the transition of the voltage regulators 106 from various power states, using the board manager 108. For example, according to an embodiment, the board manager 108 preemptively forces the voltage regulator 106 controlled by the first VR controller 107 to exit the reduced power operating state. This may occur if, for instance, the operating condition information indicates to the board manager 108 that an increase of the computational load placed on the processor 102 is forthcoming. The voltage regulator 106 is forced to exit the reduced power operating state prior to the processor 102 associated with the first VR controller 107 issuing a command to the voltage regulator 106 which indicates that the voltage regulator 106 should exit the reduced power operating state. Advantageously, because the board manager 108 has generated a profile of the input power of each voltage regulator 106 as a function of computing level of the respective processors 106 for the different power modes, the board manager 108 can determine which ones of the processors 102 will exit the reduced power operating state and which ones of the processors 102 will remain in the reduced power operating state, and accordingly transition only the voltage regulators 106 associated with these processors 102 to the appropriate power operating state.

The system can also use the operating condition information to prevent the processor 102 from adjusting the power state of the voltage regulator 106 in response to a dynamic event, e.g., a sudden increase or decrease in computational load of one of the processor 102. For example, according to an embodiment, the operating condition information is communicated from the board manager 108 to a first one of the VR controllers 107 in response to a dynamic event at the processor 102 associated with the first VR controller 107. The operating condition information in this case indicates that a dynamic event has occurred at the processor 102. The voltage regulator 106 controlled by the first VR controller 107 is prevented from entering a reduced power state in response to receiving this operating condition information at the first VR controller 107. In other words, the operating condition information is used to indicate to the voltage regulator 106 that a large computing event is forthcoming so that the voltage regulator 106 remains at optimum efficiency and/or performance.

Figure 2:
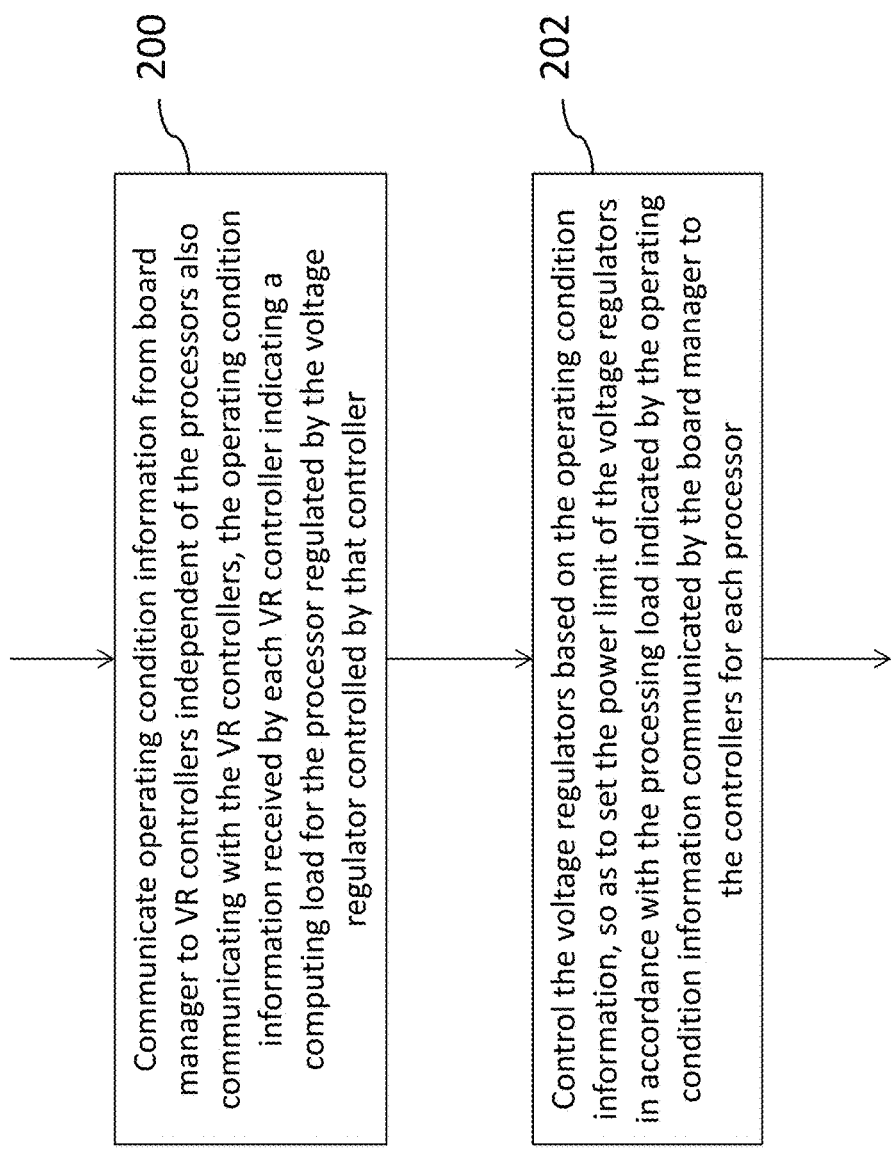
FIG. 2 illustrates a flow diagram of a method of managing resource utilization for a system board, according to an embodiment.

Referring to FIG. 2, a flow diagram of method of managing resource utilization for a system board is depicted. According to a first step 200 in the method, operating condition information is communicated e.g. as one or more commands from the board manager 108 to the controllers 107 of the voltage regulators 106 independent of the processors also communicating with the VR controllers 107. The operating condition information is received by each VR controller 107 and indicates a computing load for the processor 102 regulated by the voltage regulator 106 controlled by that controller. The operating condition information can indicate particular current or power limits.

According to a second step 202 in the method, the voltage regulators 106 are controlled based on the operating condition information, so as to set the power limit of the voltage regulators 106 in accordance with the processing load indicated by the operating condition information communicated by the board manager 108 to the VR controllers 107. The individual processors 102 are permitted to control their respective voltages, but the board manager 108 sets the power limit by sending the operating condition information e.g. in the form of one or more commands to the respective VR controllers 107 over the second communication link 112. Each power limit determined by the board manager 108 accounts for the dynamic voltage set by the corresponding processor 102. Dynamic voltage telemetry information for the processors 102 is communicated from the processor 102 to the board manager 108 over the first communication link 110.

Figure 3:
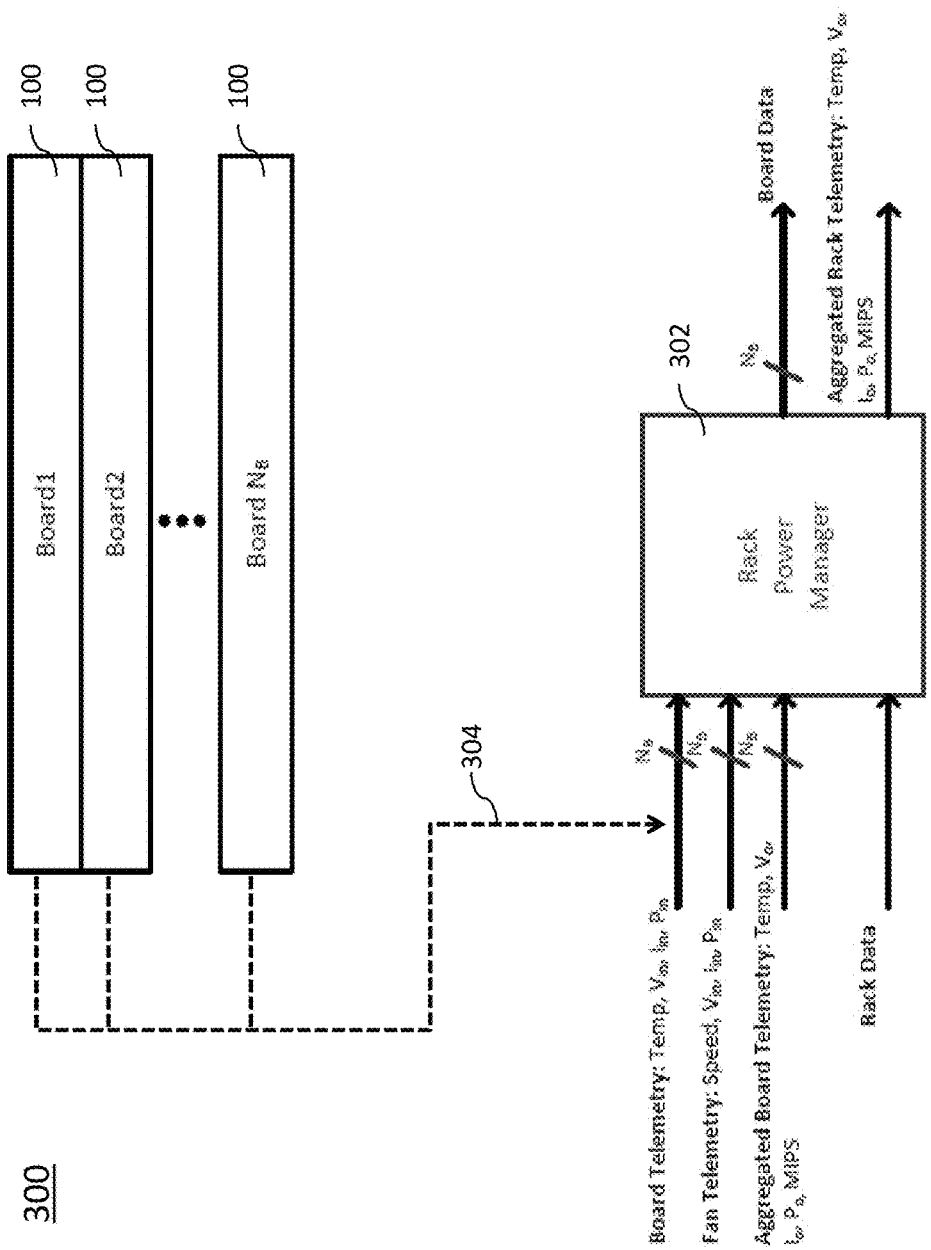
FIG. 3 illustrates a block diagram of a rack that includes a plurality of system boards and a rack level power manager in communication with the system boards that is configured to manage resources of the rack, according to an embodiment.

Referring to FIG. 3, the system board 100 of FIG. 1 has been incorporated into a rack 300 (e.g. a server rack). The rack 300 also includes a plurality of additional system boards 100 that are substantially similar or identical to the system board 100 of FIG. 1. The rack 300 includes a rack manager 302 that is configured to manage resources of the rack 300. The rack manager 302 has a direct communication link 304 to each of the board managers 108 of each system board 100.

The rack manager 302 is configured to employ a similar power efficiency management scheme, from a rack level perspective, as the board manager 108 discussed with reference to FIG. 1 does from a board level perspective. More particularly, the operating condition information is communicated from each of the board managers 108 to the rack manager 302 using the direct communication link 304 between the two. The operating condition information communicated by each of the board managers 108 indicates a computing load for the system board 100 corresponding to the respective board manager 108. The rack manager 302 prioritizes utilization of the system boards 100 by the rack manager 302, based on the operating condition information communicated by the board managers 108. The rack manager 302 directs incoming rack data to the system boards 100 based on the prioritized utilization, so that the incoming rack data is first directed to the system boards 100 whose operating condition information indicates higher efficiency and then directed to the system boards 100 whose operating condition information indicates lower efficiency. This prioritized utilization occurs only if additional processing resources are needed to process the incoming rack data. That is, the rack manager 302 is only responsive to load conditions that impose a change to the voltage regulation of at least one board 100 and thus would benefit from a priority scheme as to which boards 100 to use first.

The rack manager 302 is also configured to adjust the cooling system of the rack 300, based upon its knowledge of the power demands of the individual boards 100. As shown in FIG. 3, the rack manager 302 board receives telemetry from the board managers 108 of each board. Examples of telemetry from the board managers 108 include: temperature of the processors 102, input voltage to the processors 102 (as applied by the voltage regulators 106), input current to the processors 102, and input power to the processors 102. The rack manager 302 also receives telemetry from the cooling system of the rack 300 via a direct communication path between the rack manager 302 and the cooling system. Examples of telemetry from the cooling system include: ambient temperature of the rack 300, fan input voltage, fan input current, and fan input power. The rack manager 302 aggregates this telemetry and adjusts the cooling system of the rack 300 accordingly. For example, according to an embodiment, the rack manager 302 adjusts temperature and airflow within the rack 300 based on the operating condition information communicated by the board managers 108.

Figure 4:
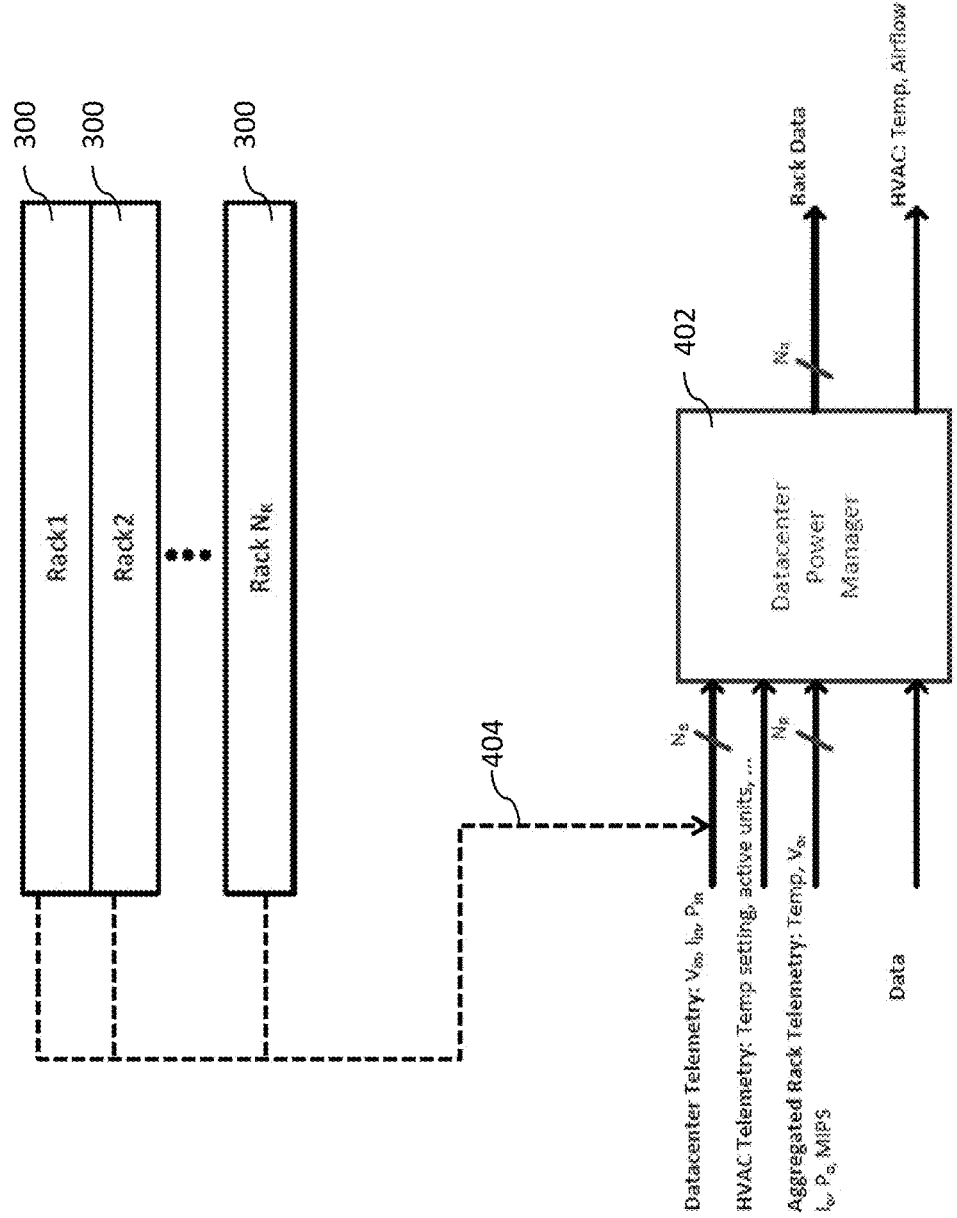
FIG. 4 illustrates a block diagram of a datacenter that includes a plurality of racks and a datacenter level power manager in communication with the racks that is configured to manage resources of the datacenter, according to an embodiment.

Referring to FIG. 4, a datacenter 400 that includes a plurality of the racks 300 described with reference to FIG. 3 is depicted. Each of the racks 300 includes a rack manager 302 that is configured to manage the resources of that rack 300, e.g., in the manner described with reference to FIG. 3. The datacenter 400 includes a datacenter manager 402 configured to manage resources of the datacenter 400. The rack manager 302 has a direct communication link 404 to each of the board managers 108 of each system board 100. The datacenter 400 employs a similar resource utilization and efficiency scheme as the board managers 108 discussed with reference to FIG. 1, and the rack 302 managers discussed with reference to FIG. 3, from a datacenter level perspective. More particularly, each of the rack managers 302 is configured to communicate operating condition information to the datacenter manager 402. The operating condition information communicated by each of the rack managers 302 indicates a computing load for the rack 300 associated with that rack manager 302. The datacenter manager 402 is configured to prioritize utilization of the racks 300, based on the operating condition information communicated by the rack managers 302. The datacenter manager 402 is configured to direct incoming datacenter data to the racks based on the prioritized utilization, so that the incoming datacenter data is first directed to the racks 300 whose operating condition information indicates higher efficiency and then directed to the racks 300 whose operating condition information indicates lower efficiency. This prioritized utilization occurs only if additional processing resources are needed to process the incoming datacenter data. That is, the datacenter 400 is only responsive to load conditions that impose a change to the voltage regulation of at least one processor 102 and thus would benefit from a priority scheme as to which voltage regulators 106 to use first.

The datacenter manager 402 is also configured to adjust the cooling mechanisms of the datacenter manager 402, based upon its knowledge of the power demands of the individual racks. As shown in FIG. 4, the datacenter manager 402 receives telemetry from the rack managers 302 of each rack 300. Examples of telemetry from the rack managers 302 include: the aggregated rack telemetry (e.g., rack temperature, rack output voltage, rack output current, rack output power, computational load (in MIPS, FLOPS, etc.); datacenter level telemetry (e.g., datacenter input power, datacenter input current, datacenter input power); and datacenter cooling system information (e.g., temp setting of the datacenter HVAC system, active HVAC units. etc.). The datacenter 400 aggregates this telemetry and adjusts the datacenter cooling system accordingly. For example, according to an embodiment, the datacenter manager 402 is configured to adjust temperature and airflow within the datacenter 400 based on the operating condition information communicated by the rack managers 302.

Although a datacenter 400 is used as an example, the embodiments described herein are equally applicable to microservers and cloud computing architectures.

Terms such as "first," "second," and the like, are used to describe various elements, regions, sections, etc. and are also not intended to be limiting. Like terms refer to like elements throughout the description.

As used herein, the terms "having," "containing," "including," "comprising" and the like are open ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of managing resource utilization for a system board which includes a plurality of processors, memory associated with each of the processors, a plurality of voltage regulators configured to regulate voltages applied to the processors and memories, and a board manager configured to manage resources of the system board, the method comprising:
receiving, at the board manager, telemetry information from controllers of the voltage regulators;
generating, at the board manager, operating condition information based upon the received telemetry information;
communicating the operating condition information from the board manager to the controllers of the voltage regulators independent of the processors also communicating with the controllers, the operating condition information received by each controller indicating a computing load for the processor regulated by the voltage regulator controlled by that controller; and
controlling the voltage regulators based on the operating condition information, so as to set the power limit of the voltage regulators in accordance with the processing load indicated by the operating condition information communicated by the board manager to the controllers for each processor.

2. The method of claim 1, the telemetry information indicates efficiencies of the voltage regulators for different power modes of the respective processors, the method further comprising:
prioritizing utilization of the processors by the board manager, based on the efficiencies of the voltage regulators for the different power modes; and
directing incoming board data to the processors based on the prioritized utilization, so that the incoming board data is first directed to the processors whose voltage regulators are more efficient and then directed to the processors whose voltage regulators are less efficient only if additional processing resources are needed to process the incoming board data.

3. The method of claim 2, herein:
the telemetry information comprises input power of the voltage regulators;
utilization of the processors is prioritized by generating a profile of the input power of each voltage regulator as a function of computing level of the respective processors for the different power modes; and
the incoming board data is directed to the processors based on the profiles so that the incoming board data is first directed to the processors whose voltage regulators have a lower input power to computing level profile and then directed to the processors whose voltage regulators have a higher input power to computing level profile only if additional processing resources are needed to process the incoming board data.

4. The method of claim 1, further comprising:
preemptively communicating the operating condition information from the board manager to a first one of the controllers before the processor associated with the first controller enters a limited power range, the preemptively communicated operating condition information indicating that the processor associated with the first controller is expected to eventually enter the limited power range and remain in the limited power range for a predetermined time period;

determining a reduced power operating state for the voltage regulator controlled by the first controller based on the preemptively communicated operating condition information; and operating in the reduced power operating state.

5. The method of claim 4, further comprising:

preemptively forcing the voltage regulator controlled by the first controller to exit the reduced power operating state prior to the processor associated with the first controller issuing a command to the voltage regulator which indicates that the voltage regulator should exit the reduced power operating state.

6. The method of claim 4, wherein the first controller remains in the reduced power operating state until the board manager indicates otherwise.

7. The method of claim 1, further comprising:

communicating the operating condition information from the board manager to a first one of the controllers after the processor associated with the first controller enters a limited power range, the operating condition information indicating that the processor associated with the first controller has entered the limited power range and will remain in the limited power range for a predetermined time period;

determining a reduced power operating state for the voltage regulator controlled by the first controller based on the operating condition information; and operating the voltage regulator controlled by the first controller in the reduced power operating state.

8. The method of claim 7, wherein the first controller remains in the reduced power operating state until the board manager indicates otherwise.

9. The method of claim 1, further comprising:

communicating the operating condition information from the board manager to a first one of the controllers in response to a dynamic event at the processor associated with the first controller, the operating condition information indicating that the dynamic event has occurred at the processor; and preventing the voltage regulator controlled by the first controller from entering a reduced power state in response to receiving the operating condition information at the first controller.

10. The method of claim 1, wherein the system board is included in a rack which also includes a plurality of additional system boards and a rack manager configured to manage resources of the rack, each of the additional system boards having a plurality of processors, memory associated with each of the processors, a plurality of voltage regulators configured to regulate voltages applied to the processors and memories, and the board manager of claim 1 for managing resources of the additional system board, the method further comprising:

communicating operating condition information from each of the board managers to the rack manager, the operating condition information communicated by each of the board managers indicating a computing load for the corresponding system board;

prioritizing utilization of the system boards by the rack manager, based on the operating condition information communicated by the board managers; and directing incoming rack data to the system boards based on the prioritized utilization, so that the incoming rack data is first directed to the system boards whose operating condition info ion indicates higher efficiency and then directed to the system boards whose operating condition information indicates lower efficiency only if additional processing resources are needed to process the incoming rack data.

11. The method of claim 10, further comprising:

adjusting temperature and airflow within the racks based on the operating condition information communicated by the board managers.

12. The method of claim 10, wherein the rack is included in a datacenter which also includes a plurality of additional racks and a datacenter manager configured to manage resources of the datacenter, each of the additional system racks having the rack manager of claim 10 for managing resources of the additional racks, the method further comprising:

communicating operating condition information from each of the rack managers to the datacenter manager, the operating condition information communicated by each of the rack managers indicating a computing load for the corresponding rack;

prioritizing utilization of the racks by the datacenter manager, based on the operating condition information communicated by the rack managers; and directing incoming datacenter data to the racks based on the prioritized utilization, so that the incoming datacenter data is first directed to the racks whose operating condition information indicates higher efficiency and then directed to the racks whose operating condition information indicates lower efficiency only if additional processing resources are needed to process the incoming datacenter data.

13. The method of claim 12, further comprising:

adjusting temperature and airflow within the datacenter based on the operating condition information communicated by the rack managers.

14. A system board, comprising:

a plurality of processors;

memory associated with each of the processors;

a plurality of voltage regulators configured to regulate voltages applied to the processors and memories; and a board manager configured to:

receive telemetry information from controllers of the voltage regulators;

generate operating condition information based upon the received telemetry information;

communicate the operating condition information to the controllers of the voltage regulators independent of the processors also communicating with the controllers, the operating condition information received by each controller indicating a computing load for the processor regulated by the voltage regulator controlled by that controller; and control the voltage regulators via the respective controllers based on the operating condition information, so as to set the power limit of the voltage regulators in accordance with the processing load indicated by the operating condition information communicated by the board manager to the controllers for each processor.

15. The system board of claim 14, wherein the telemetry information indicates efficiencies of the voltage regulators for different power modes of the respective processors, and wherein the board manager is configured to:

prioritize utilization of the processors based on the efficiencies of the voltage regulators for the different power modes; and direct incoming board data to the processors based on the prioritized utilization, so that the incoming board data is first directed to the processors whose voltage regulators are more efficient and then directed to the processors whose voltage regulators are less efficient only if additional processing resources are needed to process the incoming board data.

16. The system board of claim 15, wherein the telemetry information comprises input power of the voltage regulators and wherein the board manager is configured to:

generate a profile of the input power of each voltage regulator as a function of computing level of the respective processors for the different power modes; and direct the incoming board data to the processors based on the profiles so that the incoming board data is first directed to the processors whose voltage regulators have a lower input power to computing level profile and then directed to the processors whose voltage regulators have a higher input power to computing level profile only if additional processing resources are needed to process the incoming board data.

17. The system board of claim 14, wherein the board manager is configured to:

preemptively communicate the operating condition information to a first one of the controllers before the processor associated with the first controller enters a limited power range, the preemptively communicated operating condition information indicating that the processor associated with the first controller is expected to eventually enter the limited power range and remain in the limited power range for a predetermined time period;

determine a reduced power operating state for the voltage regulator controlled by the first controller based on the preemptively communicated operating condition information; and force the voltage regulator controlled by the first controller to operate in the reduced power operating state.

18. The system board of claim 17, wherein the board manager is configured to:

preemptively force the voltage regulator controlled by the first controller to exit the reduced power operating state prior to the processor associated with the first controller issuing a command to the voltage regulator which indicates that the voltage regulator should exit the reduced power operating state.

19. The system board of claim 14; wherein the board manager is configured to:

communicate the operating condition information to a first one of the controllers after the processor associated with the first controller enters a limited power range, the operating condition information indicating that the processor associated with the first controller has entered the limited power range and will remain in the limited power range for a predetermined time period;

determine a reduced power operating state for the voltage regulator controlled by the first controller based on the operating condition information; and force the voltage regulator controlled by the first controller to operate in the reduced power operating state.

20. The system board of claim 14, wherein the board manager is configured to:

communicate the operating condition information to a first one of the controllers in response to a dynamic event at the processor associated with the first controller, the operating condition information indicating that the dynamic event has occurred at the processor; and prevent the voltage regulator controlled by the first controller from entering a reduced power state in response to receiving the operating condition information at the first controller.

21. A datacenter, comprising:

a plurality of racks; each rack having a rack manager configured to manage resources of that rack:

a plurality of system boards, each system board having a plurality of processors, memory associated with each of the processors, a plurality of voltage regulators configured to regulate voltages applied to the processors and memories, and a board manager configured to manage resources of that system board by:

receiving telemetry information from controllers of the voltage regulators;

generating operating condition information based upon the received telemetry information;

communicating the operating condition information to the controllers of the voltage regulators of the system board independent of the processors also communicating with the controllers, the operating condition information received by each controller indicating a computing load for the processor regulated by the voltage regulator controlled by that controller; and controlling the voltage regulators of the system board via the respective controllers based on the operating condition information, so as to set the power limit of the voltage regulators in accordance with the processing load indicated by the operating condition information communicated by the board manager to the controllers for each processor; and a datacenter manager configured to manage resources of the datacenter.

22. The datacenter of claim 21, wherein:

each of the board managers is configured to communicate operating condition information to the rack manager associated with that board manager; the operating condition information communicated by each of the board managers indicating a computing load for the system board associated with that board manager;

each of the rack managers is configured to prioritize utilization of the system boards associated with that rack manager, based on the operating condition information communicated by the board managers associated with that rack manager; and each of the rack managers is configured to direct incoming rack data to the system boards associated with that rack manager based on the prioritized utilization, so that the incoming rack data is first directed to the system boards whose operating condition information indicates higher efficiency and then directed to the system boards whose operating condition information indicates lower efficiency only if additional processing resources are needed to process the incoming rack data.

23. The datacenter of claim 22, wherein each of the rack managers is configured to adjust temperature and airflow within the rack associated with that rack manager based on the operating condition information communicated by the board managers associated with that rack manager.

24. The datacenter of claim 21, wherein:

each of the rack managers is configured to communicate operating condition information to the datacenter manager, the operating condition information communicated by each of the rack managers indicating a computing load for the rack associated with that rack manager;

the datacenter manager is configured to prioritize utilization of the racks, based on the operating condition information communicated by the rack managers; and the datacenter manager is configured to direct incoming datacenter data to the racks based on the prioritized utilization, so that the incoming datacenter data is first directed to the racks whose operating condition information indicates higher efficiency and then directed to the racks whose operating condition information indicates lower efficiency only if additional processing resources are needed to process the incoming datacenter data.

25. The datacenter of claim 24, wherein the datacenter manager is configured to adjust temperature and airflow within the datacenter based on the operating condition information communicated by the rack managers.

* * * * *

UNITED STATES PATENT AND TRADEMARK OFFICE
CERTIFICATE OF CORRECTION

PATENT NO. : 9,891,700 B2  
APPLICATION NO. : 14/873898  
DATED : February 13, 2018  
INVENTOR(S) : D. Tschirhart et al.

Page 1 of 1

It is certified that error appears in the above-identified patent and that said Letters Patent is hereby corrected as shown below:

In the Claims

Column 10, Line 33 (Claim 2, Line 1) please change "1, the" to -- 1, wherein the --

Column 10, Line 47 (Claim 3, Line 1) please change "2, herein" to -- 2, wherein --

Signed and Sealed this  
Seventeenth Day of April, 2018

Andrei Iancu  
*Director of the United States Patent and Trademark Office*